W. P. HAMMOND.
TEMPERATURE INDICATING DEVICE FOR WATER COOLING SYSTEMS FOR INTERNAL COMBUSTION ENGINES.
APPLICATION FILED APR. 13, 1915.
1,178,154. Patented Apr. 4, 1916.
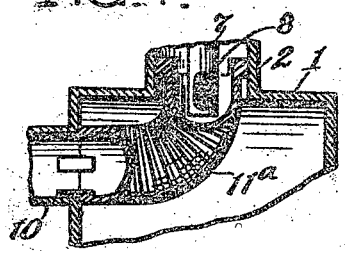
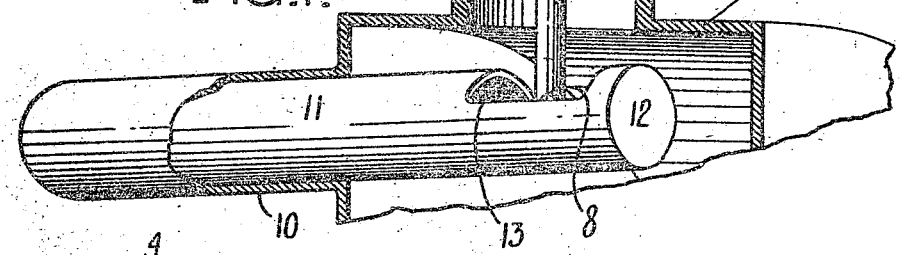
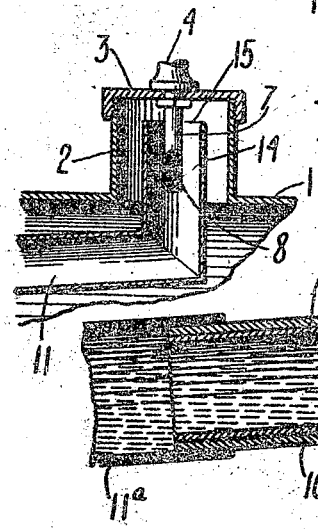
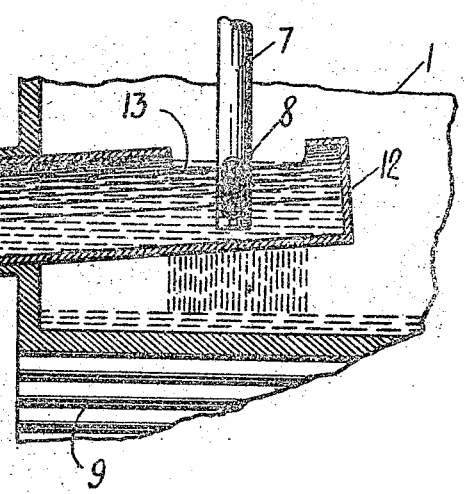
WITNESSES:
INVENTOR.
ATTORNEY

REISSUED

UNITED STATES PATENT OFFICE.

WILLIAM P. HAMMOND, OF PASSAIC, NEW JERSEY, ASSIGNOR TO THE MOTOMETER COMPANY, OF NEW YORK, N. Y., A CORPORATION OF NEW YORK.

TEMPERATURE-INDICATING DEVICE FOR WATER-COOLING SYSTEMS FOR INTERNAL-COMBUSTION ENGINES.

1,178,154.          Specification of Letters Patent.        Patented Apr. 4, 1916.

Application filed April 13, 1915. Serial No. 20,984.

*To all whom it may concern:*

Be it known that I, WILLIAM P. HAMMOND, a citizen of the United States, residing in Passaic, county of Passaic, and State of New Jersey, have invented certain new and useful Improvements in Temperature-Indicating Devices for Water-Cooling Systems for Internal-Combustion Engines, of which the following, taken in connection with the accompanying sheet of drawings, is a full, clear, and concise description thereof.

My present invention relates to that general type of device disclosed in United States Letters Patent No. 1,090,776 granted March 17, 1914, to one Harrison H. Boyce, and has for its objects to provide means whereby the temperature indicating element will at all times indicate the actual temperature of the cooling medium in the circulating system of an internal combustion engine. The device of the patent mentioned comprises a temperature indicating element supported by the filler cap of an automobile radiator and depending into the air space above the water level therein, and, as a consequence thereof, the responsive element is influenced directly by the temperature of said air space, which, under normal running conditions, is considerably below the actual temperature of the cooling medium, sometimes as much as 20 to 30 degrees. At the point of vaporization, however, where the circulating water is converted into steam, by abnormal running conditions, the temperature responsive element is caused to rise suddenly an appreciable distance along the scale of the instrument, this jump indicating to the driver in an impressive manner, the existence of an abnormal condition—a useful and highly meritorious feature in itself. The actual temperature condition of the cooling water, however, is never indicated under normal running conditions, and it is the object of my present invention to make an instrument of this general type so operate that one may be enabled at all times to know the actual temperature of the water as it circulates through the system, and to do this without changing the form of the Boyce device.

It is impossible to construct a heat responsive device capable of being mounted upon the radiator cap and being removable therewith, to project into or be partly submerged in the water because the quantity of the latter is constantly varying. The cooling water diminishes as the running of the engine continues and frequently falls below the top of the bank of air tubes, where no instrument would under any circumstances come in contact with it. For the accomplishment of the object of this invention, I provide an extension to the return pipe of the radiator, through which I bring the cooling medium constantly and at all times during its circulation in contact with the heat responsive element irrespective of the varying quantity of the water in the radiator.

Through the instrumentality of my device, an accurate indication of the temperature of the cooling medium is obtained, whether it be for experimental purposes or as a constant signal to the automobile driver.

In the accompanying drawings, Figure 1 indicates a vertical cross-sectional view of a fragmentary part of a radiator, a detachable filler cap removably supporting the heat indicator, and the return pipe of the circulating system partly in full, supporting the extension tube, which is an essential element of my invention. Fig. 2 is a like view on an enlarged scale showing a part of the bank of radiator air tubes and the flexible connection between the return pipes of the engine and the radiator. Fig. 3 is a modification showing the manner in which the present invention may be used in connection with heating indicating devices, which are provided with short stems, which, in some instances, may not project below the bottom of the filler opening. Fig. 4 is a further modification illustrating the manner in which a flexible tube may be used for the purpose of conveying the entire volume of circulating fluid issuing from the return pipe, so as to bring it into contact with the temperature-responsive element of the indicating device.

The radiator 1, is generally provided with a cylindrical extension 2, which serves as an opening through which the supply of the cooling water in the circulating system is replenished. This cylindrical extension is closed by a cap 3, which is removably connected thereto by the usual screw threads. The cap 3 carries the indicating device 4 which, in the present instance, is illustrated as comprising a temperature responsive element 5 and a scale 6. A lower projecting sleeve or sheath 7 envelops the lower part of the heat responsive element and protects the same from breakage. A series of apertures 8 are provided in the extremity of this sheath, and as the heat responsive element is supported and insulated from the frame of the device and the sheath, it is obvious that the water may be brought into actual contact with the heat responsive element, so that the latter will be operated thereby.

The numeral 9 indicates the bank of air tubes which form a structural part of the radiator, 10 the return pipe which generally forms a part of the radiator, and 11 a flexible connection between the end of the return pipe of the water jackets of the engine cylinders and the return pipe of the radiator.

It will be understood that as thus far described the construction is well-known and forms no part of my present invention other than as the same may be used in a co-operative way to accomplish the purpose of my invention.

It will also be understood from what has heretofore been said that the quantity and rate of flow of the circulating fluid varies under variable conditions. For instance, if one should operate an engine for a given length of time without a replenishment of the circulating fluid, the water-line within the radiator will fall to such an extent that any device projecting into the mouth of the filler opening, would not, under any circumstances, contact therewith. Where the capacity of the radiator is large, the engine may safely run with much less water than the designed capacity of the radiator, particularly so, in extremely cold weather. In order, therefore, to insure the temperature responsive element constantly contacting with the circulating medium irrespective of its quantity, or rate of flow, I extend the return pipe to the radiator inwardly to a point beneath the temperature responsive device when the latter is in normal operative position, so that the water will be caused to flow in contact with the device. I do this, preferably, by using a supplemental pipe 11, which has a close sliding fit within the return pipe 10. This pipe 11 is slipped through the return pipe 10, the flexible connection 11 being removed for the purpose.

The pipe 11 is closed at its inner end as at 12 and a portion of the side of the pipe is cut away to provide the aperture 13 through which the end of the instrument or heat responsive element is inserted. This aperture 13 serves as an outlet for the return water coming from the water jackets of the engine, and inasmuch as the end of the heat responsive indicating element projects well within the pipe 11, the water is caused to circulate therearound in its passage to the radiator through the aperture 13. A correct reading of the actual temperature of the water is thus obtained and by reason of the operation of the expansion of the heat responsive medium in conjunction with the scale of the dial 6. In the present instance, the temperature responsive indicating element is made long enough to project well below the top of the radiator, preferably to a point nearly in line with the lower wall of the return pipe.

In cases where the temperature responsive element does not extend below the cylindrical part of the radiator opening, it is desirable to provide an upwardly extending pipe 14, which will be concentrically positioned with respect to the cylindrical filler opening and the heat responsive element, the latter projecting downwardly and centrally thereinto, as shown in Fig. 3. The pipe 14 may be suitably secured to the pipe 11, by a union, or any equivalent means, so that the return from the water jackets of the engine will be caused to flow upwardly through the pipe 14 and over the edge 15, into the radiator, and in its passage, contact with the temperature responsive element 5, so as to cause the latter to respond and indicate the temperature condition of the water on the dial 6. In both of these described instances the cooling medium is caused to contact with the heat responsive element and operate the latter in the well known manner, and, by so doing, knowledge may be obtained of the actual temperature controlling conditions of the system, and any abnormity in such conditions may at once be detected.

By the use of my improvement, a convenient and ready understanding of the existing engine conditions can be had, and a useful application of the device to experimental purposes in connection with the manufacture of internal combustion engines obtained.

While I have illustrated and described but one specific form or construction in which my invention may find embodiment, I do not wish to be limited specifically thereto, as other means may be provided whereby the return water to the radiator may be caused to flow into contact with the heat responsive element. For instance, it may be feasible to employ a flexible pipe or tube as shown at 11ª in Fig. 4, which may be carried by the tube 7, which when inserted in place within the radiator, will extend into the return pipe 10, thus causing the water to flow therethrough into contact with the heat responsive element.

I reserve to myself a reasonable application of the doctrine of equivalency commensurate with the state of the prior art and the terms of my appended claims.

Having thus described my invention, what I claim as new herein and desire to secure by Letters Patent is:

1. In combination with the cooling system of an internal combustion engine embodying a radiator, and a return pipe therefor a heat-responsive element positioned in the radiator and a tubular member coöperating with the return pipe orifice of the radiator and the heat-responsive element for directing the circulating medium against said heat-responsive element during the return passage of said medium to said radiator.

2. A device for indicating the temperature of cooling water of an internal combustion engine, comprising in combination a radiator, and a return pipe therefor, said radiator having a filler opening a tubular member inserted in the return pipe of the radiator and projecting within the radiator below the filler opening thereof, and a temperature-responsive indicating device mounted in and carried by the filler cap of said radiator, said indicating device projecting within the tubular member so as to contact at all times with the flow of the circulating cooling medium therethrough.

3. In combination with a liquid circulating cooling system of an internal combustion engine, a radiator and a return pipe therefor, said radiator having a filler opening, a heat-responsive indicating device mounted in and carried by the filler cap thereof, said indicating device projecting within the radiator below the filler opening, and a pipe projecting from the return pipe of the radiator and into the radiator below the filler opening, said pipe having an aperture through which the indicating device projects, the end of said pipe being closed in order to cause the cooling medium to contact with the indicating device and pass through said opening during its circulation through the system.

4. A device for indicating the temperature of cooling water of an internal combustion engine, comprising in combination with the radiator and a return pipe therefor, said radiator having a filler opening, a tubular member inserted in the return pipe of the radiator, said tubular member being substantially the diameter of the return passage so as to receive substantially the entire flow of circulating cooling medium, said tubular member projecting within the radiator and below the filler opening thereof, and a temperature-responsive indicating device mounted in and carried by the filler cap of said radiator, said indicating device projecting within the tubular member so as to contact at all times with the flow of the circulating cooling medium.

5. In combination with a cooling system of an internal combustion engine embodying a radiator and a return pipe therefor, said radiator having a filler opening, a temperature-indicating device mounted in and carried by the filler cap of said radiator and having a temperature-responsive part projecting within the radiator, a member provided with an unobstructed passage coöperating with the return pipe of the radiator and the temperature-responsive part of the indicating device whereby the entire flow of the cooling medium will be caused to pass through said unobstructed passage and when circulating at all times to influence the temperature-responsive part of the indicating device.

6. In combination with a cooling system of an internal combustion engine, a radiator and a return pipe therefor, said radiator having a filler opening, an indicating device mounted in and carried by the filler cap thereof, said indicating device having a temperature-responsive part projecting within the radiator below the filler opening thereof, a member provided with an unobstructed passage located in the return pipe of the radiator and substantially filling the same, said member projecting within the radiator and beneath the filler opening thereof, being formed to accommodate the heat-responsive part of the indicating device so that the flow of the cooling medium will be caused to contact therewith while circulating.

In witness whereof I have hereunto set my hand in the presence of two subscribing witnesses.

WILLIAM P. HAMMOND.

Witnesses:
LILLIAN L. MALZER,
P. FRANK SMITH.